(12) United States Patent
Nielsen

(10) Patent No.: US 6,838,925 B1
(45) Date of Patent: Jan. 4, 2005

(54) THREE LEVEL INVERTER

(75) Inventor: Henning Roar Nielsen, Brenderup (DK)

(73) Assignee: American Power Conversion Corporation, West Kingston, RI (US)

(*) Notice: Subject to any disclaimer, the term of this patent is extended or adjusted under 35 U.S.C. 154(b) by 0 days.

(21) Appl. No.: 10/680,278

(22) Filed: Oct. 7, 2003

(51) Int. Cl.$^7$ .......................................... H02M 7/5387
(52) U.S. Cl. ........................ 327/391; 363/98; 363/132
(58) Field of Search ........................ 327/391, 423–424, 327/433, 437; 363/34–35, 37, 39–41, 47, 55, 56.01–56.05, 95, 97–98, 131–132

(56) References Cited

U.S. PATENT DOCUMENTS

| | | | | |
|---|---|---|---|---|
| 5,517,401 A | * | 5/1996 | Kinoshita et al. | 363/98 |
| 5,587,891 A | * | 12/1996 | Nakata et al. | 363/41 |
| 5,684,688 A | * | 11/1997 | Rouaud et al. | 363/132 |
| 5,953,222 A | * | 9/1999 | Mizutani | 363/56.05 |
| 6,028,779 A | * | 2/2000 | Sakamoto et al. | 363/55 |
| 6,307,760 B1 | * | 10/2001 | Ikimi | 363/39 |
| 6,392,907 B1 | * | 5/2002 | Ichikawa | 363/98 |
| 6,535,406 B1 | * | 3/2003 | Asaeda et al. | 363/98 |
| 6,597,590 B2 | * | 7/2003 | Ikimi et al. | 363/58 |
| 6,697,274 B2 | * | 2/2004 | Bernet et al. | 363/132 |

* cited by examiner

*Primary Examiner*—My-Trang Nuton
(74) *Attorney, Agent, or Firm*—Mintz Levin Cohn Ferris Glovsky and Popeo, PC

(57) ABSTRACT

The present invention relates to a high efficiency three-level inverter apparatus containing both bipolar and field effect transistors. An embodiment of a modified control scheme is also presented whereby transistors are modulated differently for each quadrant of output voltage-current phase. This embodiment of a modified control scheme allows efficient switching of field effect transistors without additional free-wheeling and series diodes.

27 Claims, 6 Drawing Sheets

THREE LEVEL INVERTER

FIELD OF THE INVENTION

The invention relates at least in part to three-level inverters and pulse width modulation methods for efficient DC to AC conversion. More specifically, embodiments are further directed to three-level inverters and methods of power inversion for use in uninterruptible power supplies.

BACKGROUND OF THE INVENTION

PWM (Pulse Width Modulation) inverters are commonly used to convert DC power into AC power. Typical applications of these inverters include use in uninterruptible power supplies (UPS), fuel cells, photovoltaic panels, and wind turbines. Further, PWM inverters may be used to provide compensation for reactive loads, harmonic cancellation of supply grids, or as variable-speed drives for induction motors. The most commonly used inverters are two-level inverters and three-level inverters.

Two-level inverters produce a modulated output having two fixed voltage levels. While potentially low cost, there are some drawbacks associated with using two-level inverters. First, the voltage swing of the inverter transistors is equal to the full, applied DC rail voltage of the inverter. This voltage swing can cause significant switching loss in the inverter transistors. Stated differently, switching loss of an inverter transistor is proportional to the amplitude of the voltage swing. To compensate for these switching losses, a lower PWM frequency may be chosen. However, this frequency may be so low that it creates audible noise (<20 kHz) or excessive output ripple current. A further drawback of two-level inverters is that the voltage output is typically derived directly from the switching bridge and may have a very high content of high frequency harmonics. This may cause additional losses in the output filter when used in typical applications. A typical two-level inverter 100 having switching transistors 101 and 102 and an output LC filter is shown in FIG. 1.

Three-level inverters produce a modulated output consisting of three fixed voltage levels. For a given output voltage this results in a lower voltage swing across the transistors than in the two-level inverters discussed above. As a result, three-level inverters produce fewer high-frequency voltage harmonics (i.e. significant amounts of energy at frequencies that are multiples of the switching frequency), allowing one to use smaller and cheaper output filter chokes (i.e. the inductive element of the output filter used to isolate the output alternating current from the output of the inverter). The reduced voltage swing and switching losses characteristic of three-level inverters make these inverters generally more efficient than two-level inverters. However, three-level inverters are typically more complex and expensive than two-level inverters. A typical three-level inverter 200 is shown in FIG. 2. The inverter 200 includes switching transistors 201, 202, 203 and 204, includes coupling diodes 211 and 212, and also includes an output LC filter.

The most common switching elements used in inverter designs are field effect transistors (FET), such as metal oxide field effect transistors (MOSFET), bipolar transistors, such as insulated gate bipolar transistors (IGBT) and bipolar junction transistors (BJT), and gate turn-off thyristors (GTO.) Traditionally, MOSFETs have been used for low DC voltage or low power inverter designs; IGBTs have been used in medium to high power or high voltage inverter designs; and GTOs have been used in very high power inverter designs.

To obtain low losses in an inverter, it is desirable to use transistors that have low switching losses and to use anti-parallel/freewheeling diodes (e.g. 311) across each transistor with good recovery behavior. MOSFETs are generally known to have very good switching performance, but the internal (anti-parallel) body-diode exhibits poor recovery behavior. Poor recovery behavior of freewheeling diodes will produce undesirable effects such as high peak currents and/or oscillations when rapidly commutated (turned off). To compensate, inverter designs using MOSFETs have traditionally required the addition of both series and freewheeling ultra-fast diodes. The addition of these diodes significantly increases the cost of the inverter design and adds conduction losses. For this reason, IGBTs have been a more practical choice for inverters operating above 100–200 VDC. IGBTs typically have poorer switching performance than MOSFETS, but require the addition of fewer diodes to provide rapid recovery behavior, since the internal series diode present in IGBTs allows the designer to add a single diode to the freewheeling path. The use of IGBTs can reduce the cost of an inverter design but may lower inverter efficiency at higher (non-audible) frequencies. FIG. 3, shows a prior art three-level inverter 300 built using IGBTs. The inverter 300 contains four IGBTs 301, 302, 303, and 304 in series, each coupled to additional diodes 311, 312, 313, and 314 placed anti-parallel in the flyback path to conduct reverse currents. Further diodes 315 and 316 provide paths to ground when the rail IGBTs 301 and 304 are turned off by the control signals 321 and 324. Control signals 321, 322, 323, and 324 control the states of the IGBTs 301, 302, 303, and 304 to regulate the output voltage 337 of the LC filter placed before the load. Another important aspect to inverter design is the ability to handle different types of loads: resistive loads, reactive loads, such as inductive or capacitive loads, and non-linear loads. The use of an inductive or a capacitive load with an inverter can result in phase shifts between the output voltage and the output current. The phase shift between current and voltage is often described using four distinct phase quadrants. FIG. 4 shows a graph 400 of a typical inverter output current waveform 401 and an output voltage waveform 402. A first quadrant 410 of the graph is characterized by both positive current and voltage values; a second quadrant 420 is characterized by positive current and negative voltage values; a third quadrant 430 is characterized by both negative current and voltage values; and a fourth quadrant 440 is characterized by positive voltage and negative current values. Both 2- and 3-level inverters are typically required to operate in all four quadrants of phase shown in the graph 400 to be practical for universal application with different types of loads. This requires the inverter to successfully operate with instantaneous output voltage and current having the same (first and third quadrant, 410 and 430) or opposite (second and fourth quadrants, 420 and 440) polarity.

As stated, a typical application for a three-level inverter is a DC-to-AC converter in a UPS to convert energy stored in a storage element, such as a battery, to AC power for loads requiring AC power. For a typical UPS application, the inverter may be used mainly to drive resistive or partly reactive (both capacitive and inductive) loads, and must also support non-linear loads. A typical UPS load will require no more than a 45-degree load current phase shift from load voltage. This corresponds to a power factor (i.e. the cosine of the phase angle between the voltage and current, providing a measure of load reaction) of approximately 0.7. Even with this low power factor, an inverter will still typically operate in the first and third quadrants for the majority of time.

SUMMARY OF THE INVENTION

The present invention relates to systems and methods for generating a three level electrical output from an inverter.

At least one embodiment of the invention provides a three-level inverter including: a first voltage node coupled to a neutral DC voltage source via a first diode oriented to prevent under-voltage of the first voltage node; a second voltage node coupled to the neutral DC voltage source via a second diode oriented to prevent over-voltage of the second voltage node; an AC output node; a first bipolar transistor, having a first collector coupled to the first voltage node and a first emitter coupled to the AC output node, wherein the first emitter and the first collector is bridged by a third diode in a direction that allows the third diode to conduct reverse currents; a second bipolar transistor, having a second collector coupled to the AC output node and a second emitter coupled to the second voltage node, wherein the second emitter and the second collector is bridged by a fourth diode in a direction that allows the fourth diode to conduct reverse currents; a first field effect transistor, having a first drain coupled to a positive DC voltage source and a first source coupled to the first voltage node; and a second field effect transistor, having a second drain coupled to the second voltage node and a first source coupled to a negative DC voltage source. Specific embodiments further considered include the above-mentioned inverter where the bipolar transistors are insulated gate bipolar transistors, where the field effect transistors are metal oxide field effect transistors, where the AC output is filtered, where the transistors are controlled by separate control signals for each phase quadrant, where the inverter forms part of an uninterruptible power supply, and where the inverter forms part of a three-phase electrical system.

At least one embodiment of the present invention is a three-level inverter that includes a control system that modulates a first field effect transistor when the inverter is operated in a first output phase quadrant characterized by both output voltage and current being positive. The control system further modulates a first and a second bipolar transistor while the first field effect transistor is in an off state and while a second field effect transistor is in an on state when the inverter is operated in a second output phase quadrant characterized by negative output voltage and positive output current. The control system further modulates the second field effect transistor when the inverter is operated in a third output phase quadrant characterized by both output voltage and current being negative. The control system further modulates the first and second bipolar transistors while the first field effect transistor is in an on state and while the second field effect transistor is in an off state when the inverter is operated in a fourth output phase quadrant characterized by negative output voltage and positive output current. Specific embodiments considered for the above mentioned inverter and the control system include modulating the second bipolar transistor when the inverter is in the first output phase quadrant and modulate the first bipolar transistor when the inverter is in the third output phase quadrant. Additionally, the control system of the inverter may determine the phase quadrant to be the fourth quadrant when the current through a filter choke rapidly changes polarity and the voltage of the AC output is positive, and may determine the phase quadrant to be the second quadrant when the current through the filter choke rapidly changes polarity and the voltage of the AC output is negative.

It is further considered that, when the AC output of the inverter is operated in the first and the third phase quadrants, the control system may leave the first and second bipolar transistors in a static state complementary to each other. Alternatively, when the AC output of the inverter is operated in the first phase quadrant, the control system may leave the first bipolar transistor in a static state, and when the AC output of the inverter is operated in the third phase quadrant the control system may actively turn the first bipolar transistor on and off. Further, when the AC output of the inverter is operated in the third phase quadrant, the control system may leave the second bipolar transistor in a static state, and when the AC output of the inverter is operated in the first phase quadrant the control system may actively turn the second bipolar transistor on and off.

Another embodiment of the present invention is directed to a method of providing alternating current from an inverter. The method includes providing: a first voltage node coupled to a neutral DC voltage source via a first diode oriented to prevent under-voltage of the first voltage node; a second voltage node coupled to the neutral DC voltage source via a second diode oriented to prevent over-voltage of the second voltage node; an AC output node; a first bipolar transistor, having a first collector coupled to the first voltage node and a first emitter coupled to the AC output node, such that the first emitter and the first collector is bridged by a third diode in a direction that allows the third diode to conduct reverse currents; a second bipolar transistor, having a second collector coupled to the AC output node and a second emitter coupled to the second voltage node, wherein the second emitter and the second collector is bridged by a fourth diode in a direction that allows the fourth diode to conduct reverse currents; a first field effect transistor, having a first drain coupled to a positive DC voltage source and a first source coupled to the first voltage node; a second field effect transistor, having a second drain coupled to the second voltage node and a first source coupled to a negative DC voltage source; and a control system for turning on and off the field effect transistors and the bipolar transistors; and supplying control signals to the transistors that differ for each of four output phase quadrants. Additionally embodiments of this method are considered such that the control system includes methods for: modulating the first field effect transistor while the first bipolar transistor is in an on state and while the second field effect transistor is in an off state when the inverter is operated in a first output phase quadrant characterized by both output voltage and current being positive; modulating the first and second bipolar transistors while the first field effect transistor is in an off state and while the second field effect transistor is in an on state when the inverter is operated in a second output phase quadrant characterized by negative output voltage and positive output current; modulating the second field effect transistor while the second bipolar transistor is in an on state and while the first bipolar transistor and the first FET are in an off state when the inverter is operated in a third output phase quadrant characterized by both output voltage and current being negative; and modulating the first and second bipolar transistors while the first field effect transistor is in an on state and while the second field effect transistor is in an off state when the inverter is operated in a fourth output phase quadrant characterized by negative output voltage and positive output current. In at least one embodiment of the method described above, the second bipolar transistor is modulated during operation in the first phase quadrant and the first bipolar transistor is modulated during operation in the third phase quadrant. It is further considered that the bipolar transistors may be modulated such that both bipolar transistors are not closed simultaneously. It is also considered that the determination of the phase quadrant may be delayed until the output current polarity remains constant for more than one modulation cycle.

BRIEF DESCRIPTION OF THE FIGURES

For a better understanding of the present invention, reference is made to the figures, which are incorporated herein by reference and in which.

DETAILED DESCRIPTION OF THE INVENTION

The invention relates to systems and methods for generating a three-level electrical output.

Figure 5:
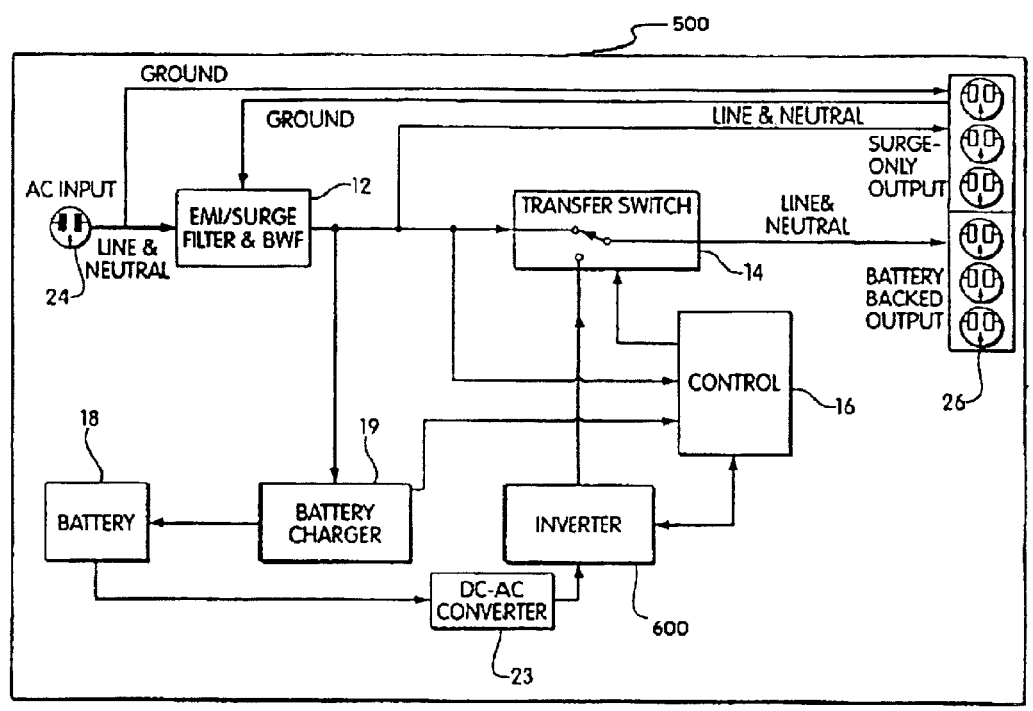
FIG. 5 is a depiction of an offline uninterruptible power supply using an embodiment of a three-level inverter in accordance with the invention.

FIG. 5 shows an embodiment of the invention directed to an offline uninterruptible power supply (UPS) 500. The UPS 500 includes an input filter/surge protector 12, a transfer switch 14, a controller 16, a battery 18, a battery charger 19, an inverter 600, and a DC-DC converter 23. The UPS also includes an input 24 for coupling to an AC power source and an outlet 26 for coupling to a load.

The UPS 500 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 600. The controller 16 determines whether the AC power available from the filter/surge protector is within predetermined tolerances, and if so, controls the transfer switch to provide the AC power from the filter/surge protector to the outlet 26. If the AC power from the filter/surge protector is not within the predetermined tolerances, which may occur because of "brown out," "high line," or "black out" conditions, or due to power surges, then the controller controls the transfer switch to provide the AC power from the inverter 600. The DC-DC converter 23 is an optional component that converts the output of the battery to a voltage that is compatible with the inverter.

The inverter 600 of the UPS 500 receives DC power from the DC-DC converter 23, converts the DC voltage to AC voltage, and regulates the AC voltage to predetermined specifications. The inverter 600 provides the regulated AC voltage to the transfer switch. Depending on the capacity of the battery and the power requirements of the load, the UPS 500 can provide power to the load during brief power source "dropouts" or for extended power outages.

For typical loads, which commonly have a power factor of greater than 0.7, the output voltage and current spends a majority of the time in the in the first 410 and third 430 phase quadrants. For efficient power conversion, embodiments of the invention use a three-level inverter 600 as described below. While the UPS 500 is an offline UPS, other types of UPSs are contemplated in alternative embodiments of the invention. In particular, the efficiency of the current invention would make this inverter an ideal choice for use in an online UPS.

As discussed below, the inverter 600 used in the UPS 500 is a three-level inverter that uses a combination of FETs and bipolar transistors. The transistors are arranged such that when the inverter operates in the first 410 or third 430 phase quadrants, requiring voltage and current of the same polarity, the characteristics of the FETs determine the switching losses, while the switching loss of the inverter during operation in the second 420 and fourth 440 quadrants, requiring voltage and current of opposite polarity, is determined by the switching losses of the bipolar transistors. Since the dominant mode of operation when used in a UPS or other application with a power factor above ~0.7 is in the first 410 and third 430 quadrants, the total switching loss of the inverter is dominated by the switching loss of the FETs.

Figure 6:
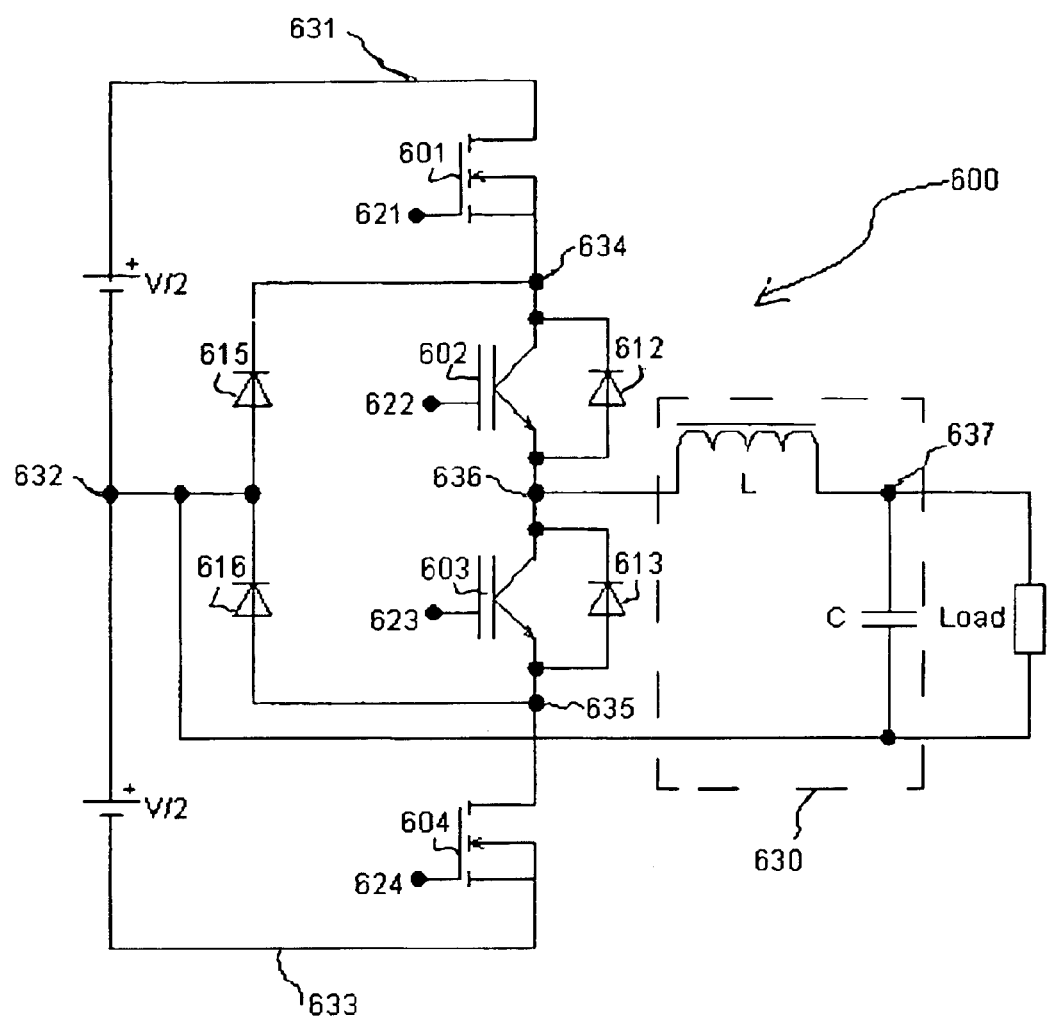
FIG. 6 is a schematic of an embodiment of a three-level inverter of the invention.

FIG. 6 shows a three-level inverter 600 of the invention, particularly useful for applications where efficiency is required in the first and third quadrants. Three inputs for coupling to DC voltages are supplied to the inverter: a +V/2 positive rail 631, a neutral 632, and a −V/2 negative rail 633. These voltage inputs act as the three voltage levels supplied to the output, ignoring any diode drops. Four switching elements 601, 602, 603, and 604 are controlled by signals 621, 622, 623, and 624. Further, diodes 612 and 613 are placed in the flyback path of the IGBTs 602 and 603 to conduct reverse currents and compensate for the lack of body diodes in the bipolar transistors. Diodes 615 and 616 are placed to allow nodes 634 and 635 to act as neutral voltage supplies when appropriate without clamping the voltage at these nodes. The output node 636 is used to provide a 3-level modulated output voltage to optional filter stage 630. When the filter stage 630 is used, the output voltage 637 is typically a low frequency AC voltage output to an external load.

The IGBTs 602 and 603 are placed closest to the inverter output 636 and the MOSFETs 601 and 604 are placed closest to the positive 631 and negative 633 DC supply rails. As described further below, with this arrangement of transistors, when operating the system output 637 in the first 410 and third 430 phase quadrants the switching loss is determined primarily by the characteristics of the MOSFETs 601 and 604. When the system output 637 is operated in the second 420 and fourth 440 phase quadrants, the switching loss is determined primarily by the characteristics of the IGBTs 602 and 603.

The field effect transistors 601 and 604 are MOSFETs and the bipolar transistors 602 and 603 are IGBTs, while in other embodiments one can use other types of FETs and bipolar transistors. In at least one embodiment the each IGBT resides in the same hermitically sealed package as its respective flyback diode (e.g. 602 and 612.) In at least another embodiment, when one uses modified control signals, the fast recovery behavior of the freewheeling diodes 612 and 613 allows the inverter to operate efficiently by avoiding rapid commutation of the FET 601 and 604 body diodes. As the control signals and apparatus of this embodiment do not require rapid recovery of the FET body diode paths, there is no need for expensive series and freewheeling diodes to be added to the FETs 601 and 604, reducing overall cost.

Control Scheme

Embodiments of the invention implement control schemes to avoid rapid commutation of the body diodes of the FETs 601 and 604 by using control signals that depend on phase quadrant and further swap control signals between each set of series connected FET and bipolar transistors when operating in 420 second or 440 fourth quadrant. These control signals may be generated by a micro-controller, a state machine implemented on and FPGA or ASIC, or in a number of other semiconductor devices used in the art. In the embodiment of the invention control signals shown in FIG. 7, during operation in the first 410 quadrant, the control 16 uses PWM to switch the FET 601 near the positive DC rail 631 and the bipolar transistor 603 of the negative path in a complementary manner, while the FET 604 near the negative DC rail 633 remains off and the control holds the bipolar transistor 602 in the positive path on. When operating in the third 430 quadrant, the opposite signal situation occurs. Further, when operating in the second 420 or fourth 440 quadrants, the control switches the bipolar transistors 602 and 603 in a complementary manner while the FETs 601 and 604 remain in static, complementary on or off states accordingly.

Figure 1:
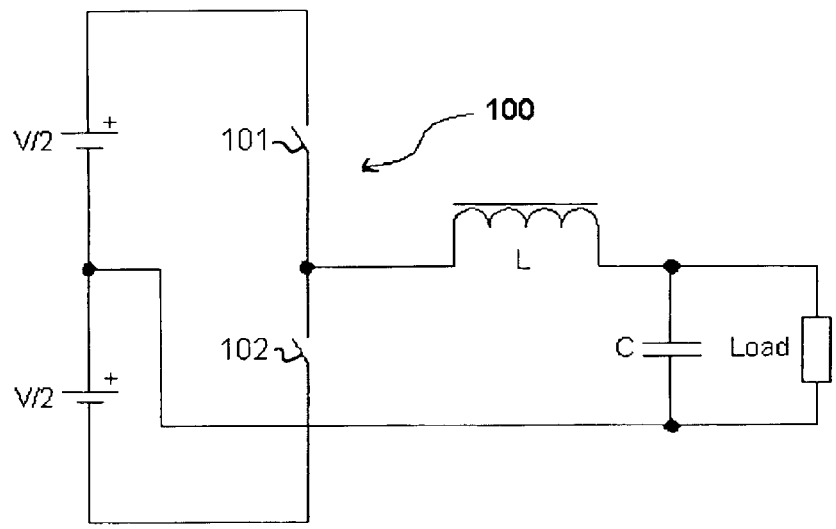
FIG. 1 is a schematic of a prior art 2-level inverter.
Figure 2:
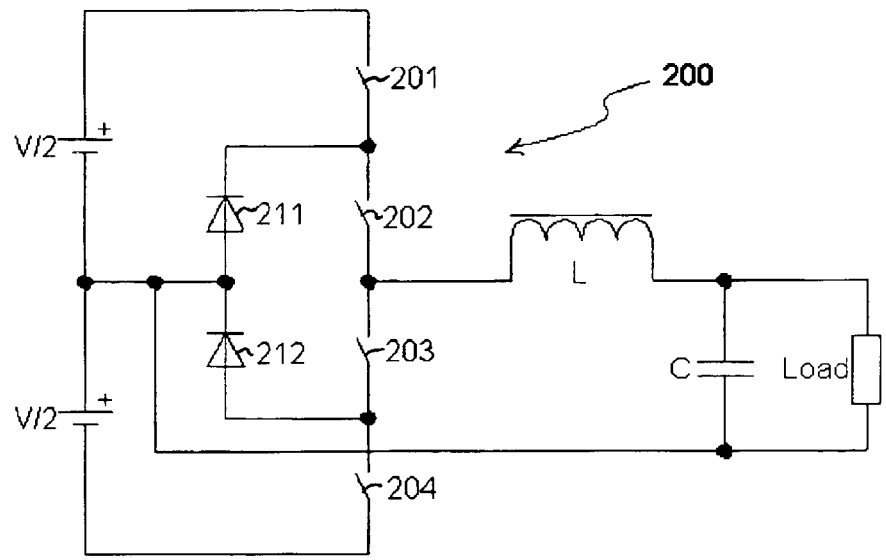
FIG. 2 is a schematic of a prior art 3-level inverter.
Figure 3:
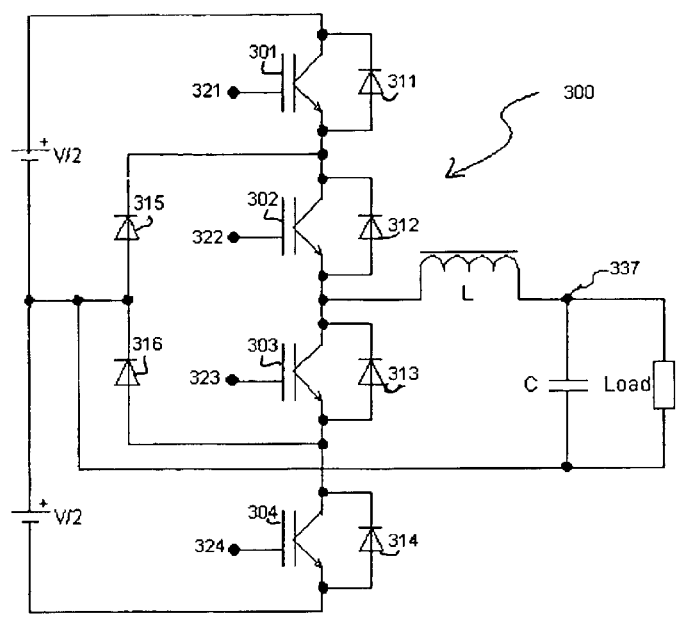
FIG. 3 is schematic of a prior-art three-level inverter using insulated gate bipolar transistors.
Figure 4:
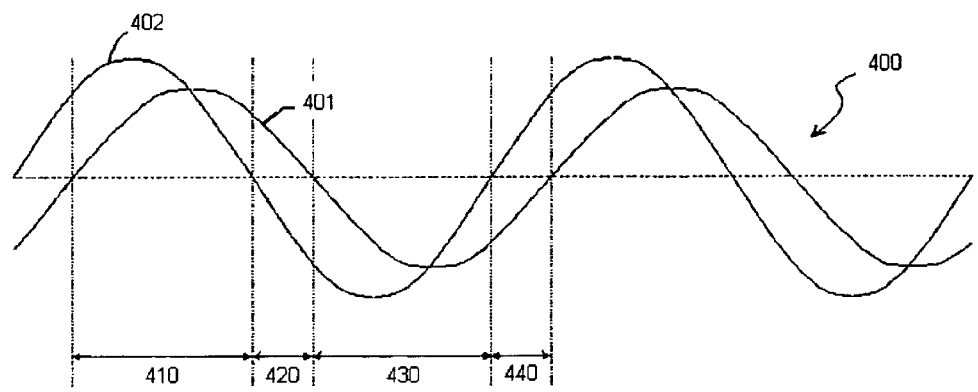
FIG. 4 is a plot of voltage-current phase quadrants resulting from an AC waveform due to a load with a power factor of 0.7.
Figure 7:
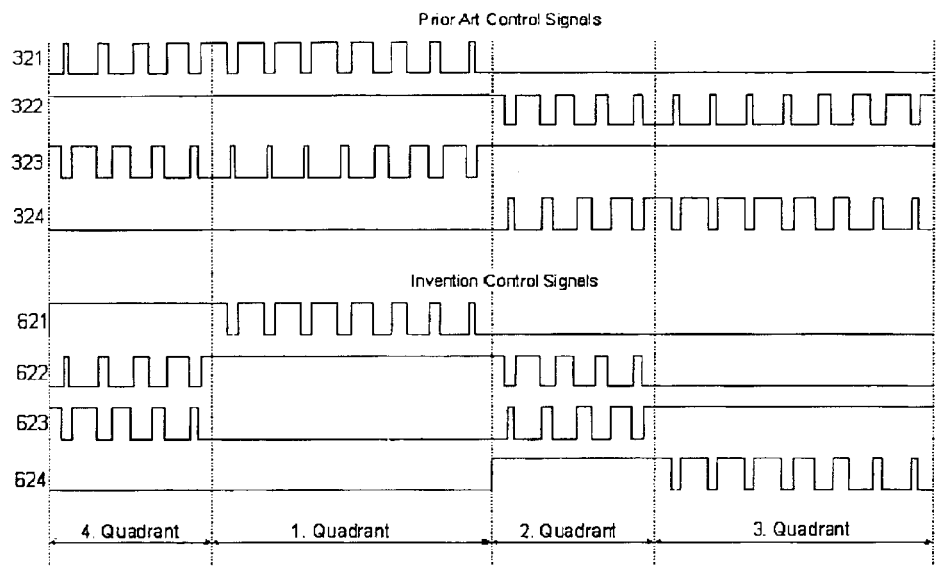
FIG. 7 is a comparison of prior art control signals and control signals used by the inverter of FIG. 6.

FIG. 7 shows control signals 321, 322, 323 and 324 typically used for modulation of prior art three-level inverters 300 and 200. In this signal scheme, the control scheme considers only the output voltage value 337 (shown in FIG. 3) when determining which transistors to toggle. For positive output voltages, first 410 and fourth 440 phase quadrants, the control scheme modulates the IGBTs 301 and 303 in a complementary manner, while the IGBTs 302 and 304 remain on and off, respectively. For negative output voltages, which include the second 420 and third 430 phase quadrants, the control scheme modulates the IGBTs 302 and 304 in a complementary manner, while IGBTs 301 and 303 remain on and off, respectively. To prevent two transistors from switching at the same time, the complementary manner used to toggle transistors allows 'dead-bands' between complementary signals. This control scheme uses a small amount of time to ensure that one transistor is completely turned off before turning on its complement and vice-versa. This praxis (i.e., translation of an idea into practice) is well known for hard-switched inverters. Using such a control scheme would be inefficient in the disclosed invention, as the control scheme used to modulate the IGBT-based inverter 300 requires the rapid commutation of the body diodes 301 and 304. At least one embodiment 600 replaces the switches 301 and 304 adjacent to the positive and negative rails with MOSFETs 601 and 604 and such rapid commutation of body diodes would reduce switching efficiency.

FIG. 7 further shows one embodiment of a control scheme used for the three-level inverter 600. To compensate for the poor recovery behavior exhibited by the body diodes of MOSFETs 601 and 604, it is desirable that the control scheme only modulates one MOSFET at a time. This behavior is shown in the signals 621 and 624 in the first 410 and third 430, and to a lesser extent, in the second 420 and fourth 440 phase quadrants of FIG. 7. The diodes 612 and 613 placed in the flyback path of the IGBTs 602 and 603 allow rapid commutation without greatly affecting overall efficiency. This configuration further allows the control scheme to modulate IGBTs 602 and 603 in a complementary manner, which includes short dead-bands when operating the inverter in the second 420 or fourth 440 phase quadrants.

When this embodiment of the control signals is operated in the first 410 quadrant, signal 621 modulates MOSFET 601 while signal 622 holds IGBT 602 on and signals 623 and 624 hold transistors 603 and 604 off. When this embodiment of the control signals is operated in the second 420 quadrant, signals 622 and 623 modulate IGBTs 602 and 603 in a complementary manner (which includes dead-bands) while signals 621 and 624 hold MOSFETs 601 and 604 in off and on states, respectively. When this embodiment of the control signals is operated in the third 430 quadrant, signal 624 modulates MOSFET 604 while signal 623 holds IGBT 603 on and signals 621 and 622 hold transistors 601 and 602 off. When this embodiment of the control signals is operated in the fourth 440 quadrant, signals 622 and 623 modulate IGBTs 602 and 603 in a complementary manner (which includes dead-bands) while signals 621 and 624 hold MOSFETs 601 and 604 in on and off states, respectively.

Figure 8:
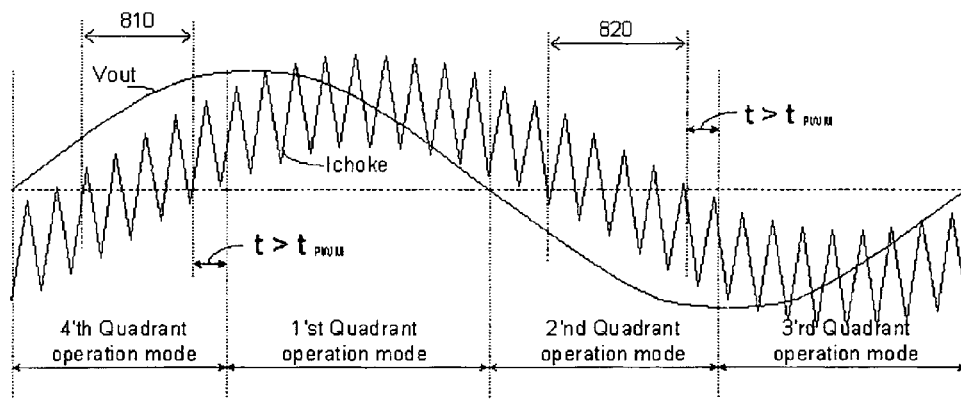
FIG. 8 is a graphical comparison the ripple current through the output filter choke and voltage at the output of the filter stage used by the inverter of FIG. 6.

Unlike the control scheme for the inverter 300, embodiments of the control scheme for the inverter 600 provide different modes of operation for each phase quadrant. One can determine the phase quadrant by sampling the output voltage 637 and the current through the choke L. In some intervals, especially at low load and no load, the inverter passes through some time intervals or is continuously in a mode where the current in the choke varies between having positive and negative instantaneous values due to ripple current, as shown in FIG. 8. During intervals 810 and 820 when the voltage is steadily in a positive or negative state, but the current is varying rapidly between positive and negative states, the theoretical phase quadrant varies with the current in the choke.

Oscillating the designated phase quadrant of the control scheme to follow this apparent rapid change of phase quadrant would unnecessarily result in rapid commutation of the body diode of the MOSFETs 601 and 604. Therefore, in at least one embodiment, when the output is in the states 810 or 820, the control scheme for the fourth 440 and second 420 quadrants is used. In this embodiment, instantaneous current in the choke, rather than the average current at the output after any filter stage, determines the mode of operation. The control monitors the current through the choke L and declares the phase quadrant for control purposes to be either the fourth or second quadrant until the choke current settles into a positive or negative state for at least one complete cycle of the PWM frequency being used. Most existing inverters already contain a current sensor that may be used for this purpose as part of an over-current protection circuit. This approach is taken to prevent current through the internal flyback diode of the MOSFETs, a situation that would result from the MOSFETs 601 and 604 being toggled according to the control signals 621 and 624 for the first 410 or third 430 quadrant while the polarity of the instantaneous output current opposes the polarity of the regulated output voltage. Such a situation would result in switching losses as described above.

Figure 9:
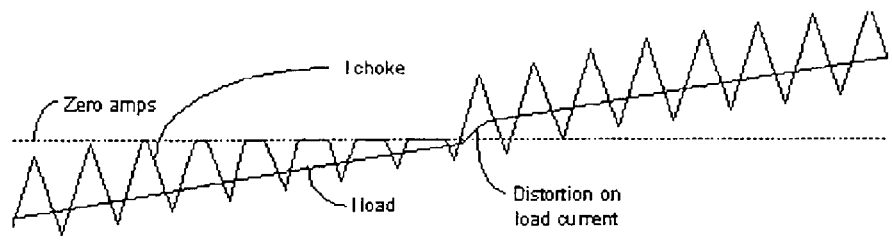
FIG. 9 is a plot of zero crossing distortion from certain control signals of FIG. 7.

The control scheme 621, 622, 623, 624 can cause the current to clip at the zero crossing when the current polarity transitions between even and odd phase quadrants, such as regions 810 and 820, if the IGBTs remain in a the static state during this transition period. FIG. 9 shows distortion created in the output current in the region 820 when the control signals operate third quadrant 430 mode when the output transitions temporarily into the second quadrant 420 due to the high frequency oscillation of the current through the filter choke. The third quadrant 430 signals prevent the polarity of the output current from becoming positive, so the instantaneous current clips at the zero crossing until the second quadrant 420 control signals allow the current to be of either polarity. The resulting distortion appears as a jump in the average current at the zero crossing. The controller 16 can determine the appropriate quadrant signals to use during these transition regions between phase quadrants based on conditions of instantaneous choke current. By declaring the phase quadrant to be in the even quadrants 420 and 440 during transition periods 810 and 820 and maintaining sufficient dead-bands between complementary signals 622 and 623, clipping at the zero crossing can be avoided. Alternatively, new signals 622a and 623a can be used as shown in FIG. 10.

Figure 10:
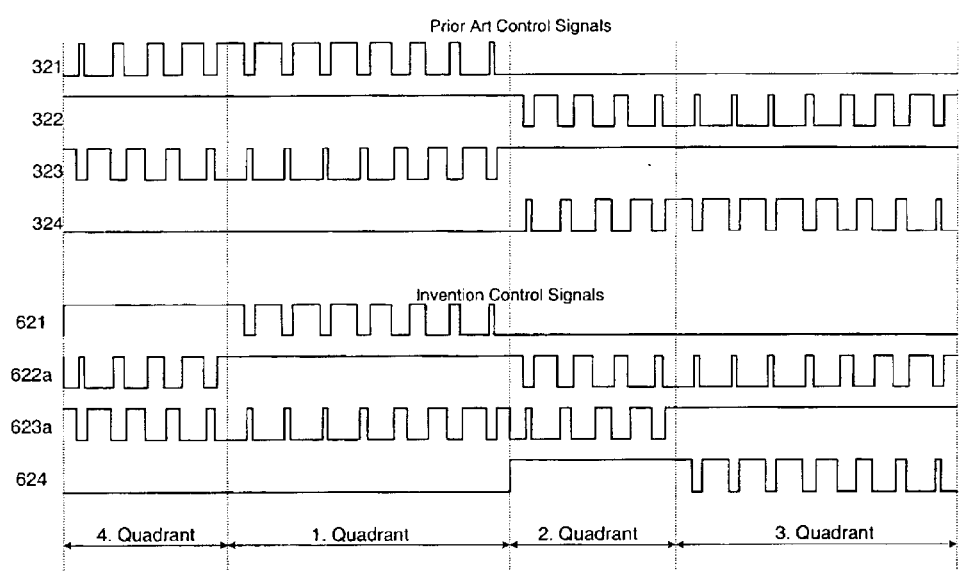
FIG. 10 is a schematic of alternative embodiment control signals.

FIG. 10 shows another embodiment of a control scheme used for the three-level inverter 600. This embodiment uses the same control signals in the second 420 and fourth 440 quadrants as those shown in FIG. 7. During the first quadrant 410 the IGBT 603 is modulated by control signal 623a complementary to MOSFET 601 allowing dead-bands between complementary transitions. During the third quadrant 430 the IGBT 602 is modulated by control signal 622a complementary to MOSFET 604 allowing dead-bands between complementary transitions. This enables the MOSFETs to provide a path to the opposing rail during transition periods such as 810 and 820 to prevent current clipping such as in FIG. 9. By using control signals 621, 622a, 623a, and 624, zero-crossing clipping is avoided for all quadrant control signals, and controller 16 can determine the instantaneous quadrant based on other rules than those used for the signals in FIG. 7.

DESCRIPTION OF THE SWITCHING STAGES

When operated in the first quadrant using the control signals 621, 622a, 623a, and 624, the control modulates the positive MOSFET 601 according to a control signal 621 as explained in the control signal description above, while the positive IGBT 602 is held on and the negative switch 604 is held in off states. Bipolar transistor 603 is modulated complementary to MOSFET 601 according to signal 623a. When the positive MOSFET 601 is turned on, current flows along the conduction path created from the +V/2 DC rail 631, through the positive switches 601 and 602, through the optional filter choke L, and to the load at the output node 637. When the positive MOSFET 601 is turned off, the conduction path from the neutral supply node 632, through the neutral path diode 615, through the positive IGBT 602, through the optional filter choke L, and to the load at the output node 637 is available. When operating in the first quadrant, the conducting path alternates between these two conduction paths. When signal 623a is used, as opposed to signal 623, a conduction path is also available from the output node 637, through the filter choke L, through the IGBT 603, through the diode 616, to the neutral supply node 632. However, this path will only be used when the polarity of the current is opposite the voltage, such as during the transition region 810 between the first 410 and fourth 440 quadrants. The switching losses at turn-off of the positive MOSFET 601 only depend on the switching performance of the positive MOSFET 601, whereas switching losses at turn on depends on both the switching performance of the positive MOSFET 601 and the recovery characteristics of the neutral path diode 615.

Operation in the third quadrant 430 is the negative voltage equivalent of operation explained for the first quadrant 410, modulating the negative MOSFET 604 while the positive switches 601 and 602 are held in off states and the negative IGBT 603 is held on. When the negative MOSFET 604 is turned on, current flows along the conduction path created from the load at the output node 637, through the optional filter choke to the output node 636, through the negative switches 603 and 604, to -V/2 DC rail 633. When the negative MOSFET 604 is turned off the conduction path from the load at the output node 637, through the optional filter choke to the output node 636, through the negative IGBT 603, through the neutral path diode 616, to the neutral supply node 632 is available. When operating in the first quadrant, the conducting path alternates between these two conduction paths. When signal 622a is used, as opposed to signal 622, a conduction path is also available from the neutral supply node 632, through the diode 616, through the IGBT 603, through the filter choke L, to the output node 637. However, this path will only be used when the polarity of the current is opposite the voltage, such as during the transition region 820 between the third 430 and second 420 quadrants. The switching losses at turn-off of the negative MOSFET 604 only depends on the switching performance of the MOSFET 604, whereas switching losses at turn on depends on both the switching performance of the MOSFET 604 and the recovery characteristics of the negative path diode 616.

When operating the fourth quadrant 440, the MOSFETs 601 and 604 are held in on and off states respectively, while the IGBTs 602 and 603 are modulated in a complementary fashion separated by short dead-bands as explained above. When negative IGBT 603 is turned on and the positive IGBT 602 is turned off, current is conducted along the conduction path created from the output node 637, through the filter choke L to the output node 636, through the negative IGBT 603 and neutral path diode 616 to the neutral supply node 632. When the negative IGBT 603 is turned off and the positive IGBT 602 is turned on, current is conducted along the conduction path created from the output node 637, through the filter choke L to the output node 636, through the freewheeling diode 612, through the positive MOSFET 601 to the +V/2 rail 631. When operating in the fourth quadrant, the conducting path alternates between these two conduction paths. The switching losses during this mode are determined by the switching performance of the negative IGBT 603, and the recovery behavior of the freewheeling diode 612.

When operating the second quadrant 420, the MOSFETs 601 and 604 are held in off and on states respectively, while the IGBTs 602 and 603 are modulated in a complementary fashion separated by short dead-bands as explained above. When positive IGBT 602 is turned on and the negative IGBT 603 is turned off, current is conducted along the conduction path created from the neutral supply node 632, through the neutral path diode 615 and the positive IGBT 602 to the output node 636, through the filter choke L to the output node 637. When the negative IGBT 603 is turned on and the positive IGBT 602 is turned off, current is conducted along the conduction path created from the -V/2 rail 633, through negative MOSFET 604, through the freewheeling diode 613 to the output node 636, through the filter choke to the output node 637. When operating in the second quadrant, the conducting path alternates between these two conduction paths. The switching losses during this mode are determined by the switching performance of the positive IGBT 602, and the recovery behavior of the freewheeling diode 613.

The inverter described above can be used in a UPS system. Other applications are possible as mentioned above.

In a UPS system with typical loads, the dominant mode of operation of the inverter is in the first 410 and third 430 phase quadrants. Due to the low switching losses of MOSFETs, it is therefore possible to obtain and expect very high efficiency when used for such an application. Compared to typical prior art three-level inverter where all four switching elements are IGBTs or other bipolar transistors, such as that shown in FIG. 5, the inverter 600 reduces the overall switching loss by up to about 30% for typical UPS applications when using non-audible PWM frequencies to control the transistors. Embodiments of inverters of the present invention can further be used in a three-phase application by replicating the inverter circuit for each of the three desired output voltages and varying the control signals accordingly.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A three-level inverter apparatus comprising:
   a first voltage node coupled to a neutral DC voltage source via a first diode oriented to prevent under-voltage of said first voltage node;
   a second voltage node coupled to the neutral DC voltage source via a second diode oriented to prevent over-voltage of said second voltage node;
   an AC output node;
   a first bipolar transistor, having a first collector coupled to said first voltage node and a first emitter coupled to said AC output node, wherein said first emitter and said first collector is bridged by a third diode in a direction that allows said third diode to conduct reverse currents;
   a second bipolar transistor, having a second collector coupled to said AC output node and a second emitter coupled to said second voltage node, wherein said second emitter and said second collector is bridged by a fourth diode in a direction that allows said fourth diode to conduct reverse currents;
   a first field effect transistor, having a first drain coupled to a positive DC voltage source and a first source coupled to said first voltage node; and
   a second field effect transistor, having a second drain coupled to said second voltage node and a first source coupled to a negative DC voltage source.

2. An inverter as in claim 1, wherein said first and second bipolar transistors are insulated gate bipolar transistors and wherein said first and second field effect transistors are metal oxide field effect transistors.

3. An inverter as in claim 2, whereby the inverter is part of an uninterruptible power supply.

4. An inverter as in claim 1 wherein said AC output node is an output of a filter stage, the output of said filter stage being for use with a load.

5. An inverter as in claim 1, wherein the inverter further comprises a control means for turning on and off said first and said second field effect transistor and said first and said second bipolar transistor and wherein said control means supplies control signals to said transistors that differ for each of four output phase quadrants.

6. An inverter as in claim 5, wherein said control means is operative to:
   modulate said first field effect transistor when said inverter is operated in a first output phase quadrant characterized by both output voltage and current being positive;
   modulate said first and second bipolar transistors while said first field effect transistor is in an off state and while said second field effect transistor is in an on state when said inverter is operated in a second output phase quadrant characterized by negative output voltage and positive output current;
   modulate said second field effect transistor when said inverter is operated in a third output phase quadrant characterized by both output voltage and current being negative; and
   modulate said first and second bipolar transistors while said first field effect transistor is in an on state and while said second field effect transistor is in an off state when said inverter is operated in a fourth output phase quadrant characterized by negative output voltage and positive output current.

7. An inverter as in claim 6, wherein said control means is further operative to:
   modulate said second bipolar transistor when said inverter is in said first output phase quadrant;
   modulate said first bipolar transistor when said inverter is in said third output phase quadrant.

8. An inverter as in claim 6 wherein the control means is operative to determine the phase quadrant by determining the voltage and current through a filter choke.

9. An inverter as in claim 8 wherein the control means is operative to determine the phase quadrant to be:
   said fourth quadrant when the current through said filter choke rapidly changes polarity and the voltage of said AC output node is positive;
   said second quadrant when the current through said filter choke rapidly changes polarity and the voltage of said AC output node is negative.

10. An inverter as in claim 1, wherein the inverter is part of an uninterruptible power supply.

11. An inverter as in claim 1, wherein the inverter output corresponds to one output of a three-phase voltage source.

12. An inverter as in claim 1, wherein said first bipolar transistor and said third diode are in a first sealed package; and wherein said second bipolar transistor and said fourth diode are in a second sealed package.

13. A three-level inverter comprising:
   an electrical output means;
   a means for coupling to a positive voltage source;
   a means for coupling to a negative voltage source;
   a means for coupling to a neutral voltage source;
   a first controlled switching means for allowing or restricting electrical current between a positive voltage source and a second controlled switching means according to a first control means;
   said second controlled switching means for allowing or restricting electrical current between:
      said first controlled switching means and said electrical output means according to a second control means; and
      a neutral voltage source and said electrical output means according to said second control means;
   a third controlled switching means for allowing or restricting electrical current between:
      a fourth controlled switching means and said electrical output means according to a third control means; and said neutral voltage source and said electrical output means according to said third control means;

said fourth controlled switching means for allowing or restricting electrical current between a negative voltage source and said third controlled switching means according to a fourth control means;

wherein said first control means is operative to actively turn said first switching means on and off when said electrical output means is operated in a first phase quadrant, said first control means further leaving said first switching means in a static state when said electrical output means is operated in each of the remaining phase quadrants;

wherein said second control means is operative to actively turn said second switching means on and off when said electrical output means is operated in a second phase quadrant and a fourth phase quadrant, wherein said third control means is operative to actively turn said third switching means on and off complementary to said second switching means when said electrical output means is operated in said second phase quadrant and said fourth phase quadrant, wherein said fourth control means is operative to actively turn said fourth switching means on and off when said electrical output means is operated in a third phase quadrant, said fourth control means further leaving said fourth switching means in a static state when said electrical output means is operated in each of the remaining phase quadrants.

14. A three-level inverter as in claim 13 whereby said electrical output means includes a filter means.

15. A three-level inverter as in claim 14 whereby said inverter is part of an uninterruptible power supply.

16. A three-level inverter as in claim 14 whereby said electrical output means is used to supply one of the output voltages of a three-phase system.

17. A three-level inverter as in claim 13 whereby said phase quadrants are determined by monitoring voltage and current in said electrical output means.

18. A three-level inverter as in claim 13 whereby:

said second control means is further operative to leave said second switching means in a static state when said electrical output means is operated in said first and said third phase quadrants;

said third control means is further operative to leave said third switching means in a static state complementary to said second switching means when said electrical output means is operated in said first and said third phase quadrants.

19. A three-level inverter as in claim 13 whereby:

said second control means is further operative to leave said second switching means in a static state when said electrical output means is operated in said first phase quadrant and to actively turn said second switching means on and off when said electrical output means is operated in said third phase quadrant;

said third control means is further operative to leave said third switching means in a static state when said electrical output means is operated in said third phase quadrant and to actively turn said third switching means on and off when said electrical output means is operated in said first phase quadrant.

20. A method of providing alternating current from an inverter comprising providing:

a first voltage node coupled to a neutral DC voltage source via a first diode oriented to prevent under-voltage of said first voltage node;

a second voltage node coupled to the neutral DC voltage source via a second diode oriented to prevent over-voltage of said second voltage node;

an AC output node;

a first bipolar transistor, having a first collector coupled to said first voltage node and a first emitter coupled to said AC output node, wherein said first emitter and said first collector is bridged by a third diode in a direction that allows said third diode to conduct reverse currents;

a second bipolar transistor, having a second collector coupled to said AC output node and a second emitter coupled to said second voltage node, wherein said second emitter and said second collector is bridged by a fourth diode in a direction that allows said fourth diode to conduct reverse currents;

a first field effect transistor, having a first drain coupled to a positive DC voltage source and a first source coupled to said first voltage node;

a second field effect transistor, having a second drain coupled to said second voltage node and a first source coupled to a negative DC voltage source; and a control means for turning on and off said first and second field effect transistors and said first and second bipolar transistors; and supplying control signals to said transistors that differ for each of four output phase quadrants.

21. The method of claim 20 wherein supplying control signals comprises:

modulating said first field effect transistor while said first bipolar transistor is in an on state and while said second field effect transistor is in an off state when said inverter is operated in a first output phase quadrant characterized by both output voltage and current being positive;

modulating said first and second bipolar transistors while said first field effect transistor is in an off state and while said second field effect transistor is in an on state when said inverter is operated in a second output phase quadrant characterized by negative output voltage and positive output current;

modulating said second field effect transistor while said second bipolar transistor is in an on state and while said first bipolar transistor and said first FET are in an off state when said inverter is operated in a third output phase quadrant characterized by both output voltage and current being negative; and modulating said first and second bipolar transistors while said first field effect transistor is in an on state and while said second field effect transistor is in an off state when said inverter is operated in a fourth output phase quadrant characterized by negative output voltage and positive output current.

22. An inverter as in claim 21, wherein said first bipolar transistor and said third diode are in a first sealed package; and wherein said second bipolar transistor and said fourth diode are in a second sealed package.

23. The method as in claim 21 further comprising monitoring the output of the inverter to determine the phase quadrant the inverter is operating in.-

24. The method as in claim 23 whereby the phase quadrant is not updated until the output is determined to remain in a phase quadrant for more than one modulation cycle.

25. The method as in claim 21 wherein modulation of the first and second bipolar transistors is performed such that the first and second bipolar transistors are not both closed simultaneously during operation in any phase quadrant.

26. The method as in claim 21 wherein modulation of the first and second bipolar transistors is performed such that the first and second bipolar transistors are not both closed simultaneously during operation in the second and fourth phase quadrants.

27. The method as in claim 21 wherein modulation of the first and second bipolar transistors is performed such that the second bipolar transistor is modulated during operation in the first phase quadrant and the first bipolar transistor is modulated during operation in the third phase quadrant.

* * * * *